(12) United States Patent
Kindberg et al.

(10) Patent No.: US 8,100,415 B2
(45) Date of Patent: Jan. 24, 2012

(54) WHEEL SUSPENSION

(75) Inventors: Stefan Kindberg, Södertälje (SE); Johan Kuikka, Uppsala (SE)

(73) Assignee: Trionic Sverige AB (SE)

( * ) Notice: Subject to any disclaimer, the term of this patent is extended or adjusted under 35 U.S.C. 154(b) by 557 days.

(21) Appl. No.: 12/087,966

(22) PCT Filed: Feb. 13, 2007

(86) PCT No.: PCT/SE2007/050087
§ 371 (c)(1), (2), (4) Date: Nov. 26, 2008

(87) PCT Pub. No.: WO2007/094735
PCT Pub. Date: Aug. 23, 2007

(65) Prior Publication Data
US 2009/0212508 A1 Aug. 27, 2009

(30) Foreign Application Priority Data
Feb. 15, 2006 (SE) ........................ 0600335

(51) Int. Cl.
*B62B 5/02* (2006.01)
*B62B 9/02* (2006.01)
*B62D 61/10* (2006.01)

(52) U.S. Cl. ........... 280/5.28; 180/8.1; 180/8.3; 180/21; 280/5.2; 280/5.26; 280/87.03

(58) Field of Classification Search .............. 180/7.1, 180/8.1, 8.2, 8.3, 8.7, 19.1, 19.3, 21, 22, 180/24; 280/5.2, 5.26, 47.1, 47.12, 47.15, 280/47.16, 47.17, 47.131, 47.2, 47.24, 47.26, 280/87.021, 87.03, 87.051
See application file for complete search history.

(56) References Cited

U.S. PATENT DOCUMENTS 1,938,498 A * 12/1933 Porcello ..................... 267/253
(Continued)

FOREIGN PATENT DOCUMENTS

SE 0102878 A 3/2003
(Continued)

OTHER PUBLICATIONS

International Patent Application No. PCT/SE2007/050087, International Search Report mailed May 3, 2007, 3 pgs.
(Continued)

*Primary Examiner* — Tony H. Winner
*Assistant Examiner* — Marc Scharich
(74) *Attorney, Agent, or Firm* — Schwegman, Lundberg & Woessner, P.A.

(57) ABSTRACT

The present invention relates to a wheel suspension for mounting on a frame (3) of a vehicle, which, in its direction of propulsion, is arranged to be able to scale an obstacle (7), the wheel suspension (1) comprises a link element (9) arranged rotatably about a rotation point (R), to which rotation point (R), via the frame (3), can be applied a force (Gx) for propulsion, the link element (9) comprises a first and a second wheel axle (11, 13), the second wheel axle (13) serves as a moment axis (X) about which the link element (9) tends to rotate when a force (F) is applied to the first wheel axle (11) in the direction opposite to the direction of travel. The link element (9) acts as a lever arm by virtue of the rotation point (R) being situated at a distance from an imaginary straight line (L) intersecting the first and the second wheel axle (11, 13) and in a plane transversely to the extent of the moment axis (X).

21 Claims, 5 Drawing Sheets

U.S. PATENT DOCUMENTS

| | | | |
|---|---|---|---|
| 4,056,158 A | | 11/1977 | Ross |
| 4,312,417 A | * | 1/1982 | Dalton et al. .................. 180/8.2 |
| 4,687,213 A | * | 8/1987 | Ridderstolpe ................ 280/5.26 |
| 5,655,615 A | * | 8/1997 | Mick .......................... 180/24.02 |
| 6,293,560 B1 | * | 9/2001 | Byatt ............................ 280/5.2 |
| 6,571,892 B2 | * | 6/2003 | Kamen et al. ................. 180/8.2 |
| 6,926,287 B1 | * | 8/2005 | Maher ......................... 280/5.26 |
| 7,249,775 B2 | | 7/2007 | Rosenquist |
| 2003/0122327 A1 | * | 7/2003 | Wu ............................... 280/5.2 |
| 2006/0145433 A1 | * | 7/2006 | Kim ............................ 280/5.28 |

FOREIGN PATENT DOCUMENTS

WO     WO-02/062285 A1     8/2002

OTHER PUBLICATIONS

International Patent Application No. PCT/SE2007/050087, Written Opinion mailed May 3, 2007, 5 pgs.

* cited by examiner

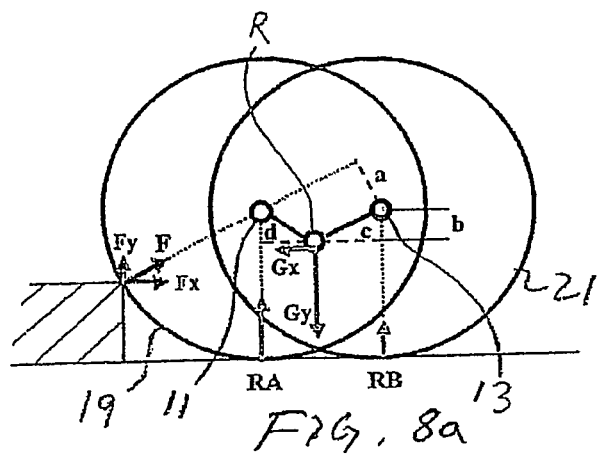
FIG. 8a
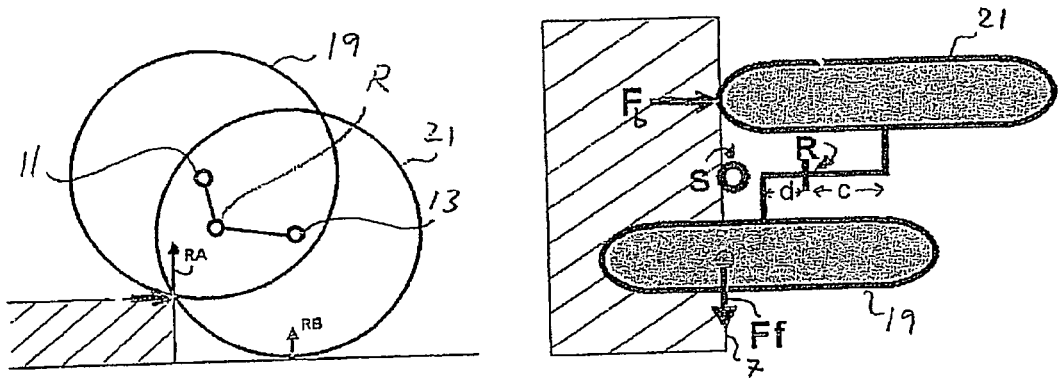
FIG 8b
FIG 8c
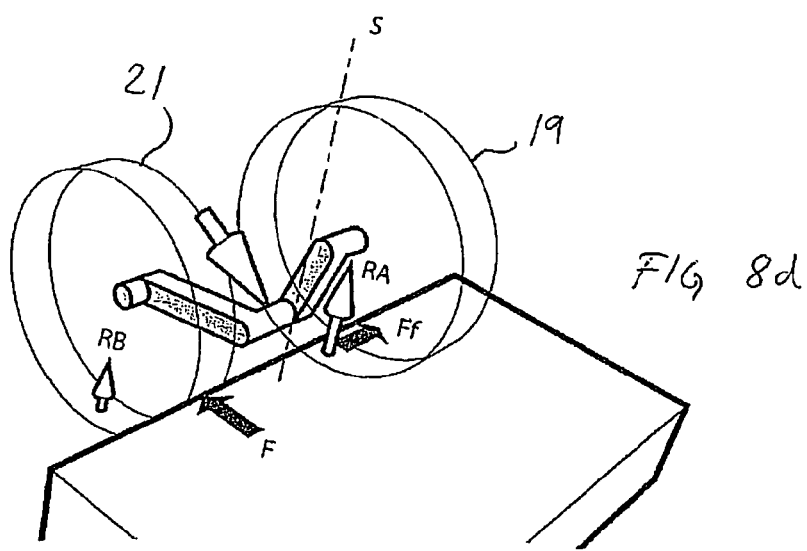
FIG 8d

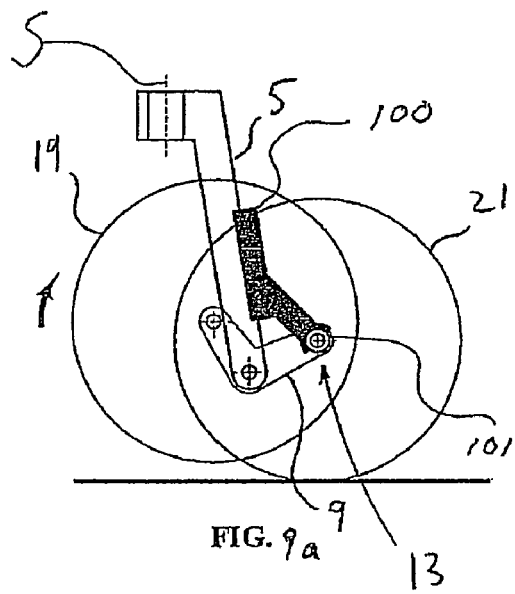
FIG. 9a
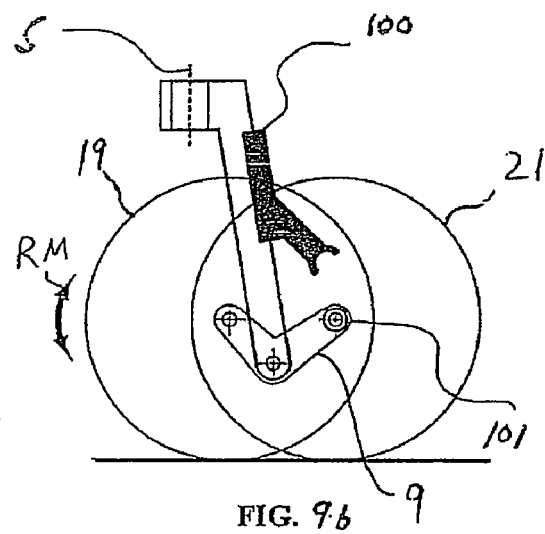
FIG. 9b
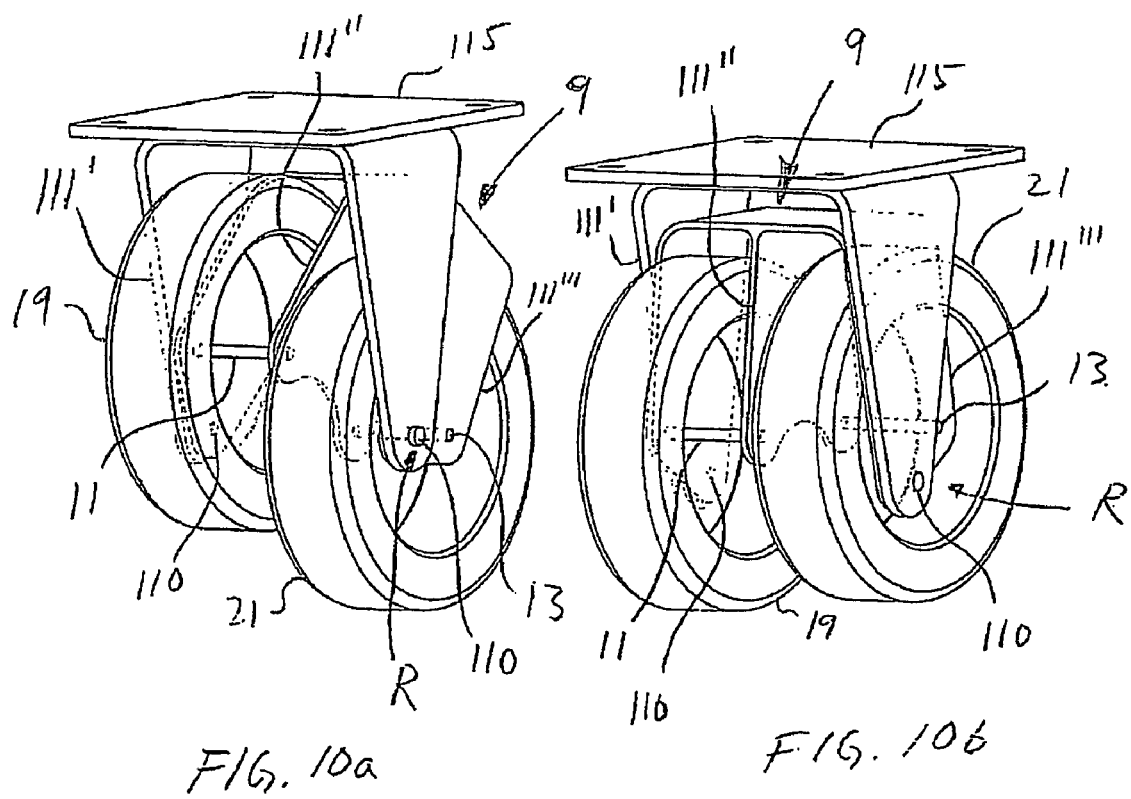
FIG. 10a
FIG. 10b

WHEEL SUSPENSION

RELATED APPLICATIONS

This application is a nationalization under 35 U.S.C. 371 of PCT/SE2007/050087, filed Feb. 13, 2007 and published as WO 2007/094735 A1, on Aug. 23, 2007, which claimed priority under 35 U.S.C. 119 to Sweden Patent Application Serial No. 0600335-4, filed Feb. 15, 2006; which applications and publication are incorporated herein by reference and made a part hereof.

TECHNICAL FIELD

The present invention relates to a wheel suspension.
The invention can be assigned to the vehicle manufacturing industry.

BACKGROUND ART

Wheel suspensions currently exist in which wheels are mounted on a link element and the link element itself is mounted about a rotation point on the frame of the vehicle. Such a wheel suspension is described in Swedish patent application no. SE 0102878-6, in which the wheel suspension is designed to be able to absorb vertical motions which are imparted to the wheels when these are driven over bumps, such that a compensating action is acquired for the vehicle.

In document WO 02/062285, a wheel suspension is described comprising a link element to which a force can be imparted in order to improve the climbing characteristics of a vehicle. The link element comprises a lifting wheel, which lifts the front end of the vehicle by means of a force imparted to a lever arm construction. The link element is a supplementary construction and is separated from the main wheels of the vehicle. The construction means that a user must perform an additional maneuver in order to get the vehicle to climb.

SUMMARY

The present invention seeks to find a solution which means that the climbing characteristics over an obstacle, such as for example a curb, are improved, while, at the same time, simplest possible handling of the vehicle is granted. At the same time, the present invention seeks to produce a simple structure which effectively provides an inherent springing function without supplementary spring elements.

This has been achieved by means of the present invention by virtue of the wheel suspension described in the introduction, the wheel suspension being characterized by the distinguishing features described herein.

In this way, the necessary propulsion force is utilized to also lift the wheels of the first wheel axle. This is achieved through a lever arm effect, in which rotation of the link element is effected by means of the force applied to the rotation point, that is to say a vehicle-propelling linear force in the direction of propulsion, and the acquired distance for the lever arm of the link element.

A depressed rotation point below the centre of the wheel axles which creates said lever arm effect also contributes to a smoother propulsion of the vehicle, since the propulsive force is converted to a certain extent into a lifting force. Hence, nor is there a need to use any resilient element opposing the rotation of the link element.

Alternatively, a first distance between the first wheel axle and the rotation point tallies with a second distance between the second wheel axle and the rotation point.

Thus a user can set the wheels of the wheel suspension in line with the direction of travel without regard to the order in which the front and rear wheels are adjusted, while at the same time obtaining the desired lever arm effect. The pivotability of the vehicle remains just as good.

Preferably, a first distance between the first wheel axle and the rotation point differs from a second distance between the second wheel axle and the rotation point.

In this way, the lever arm effect can be acquired even under a steep climb, with maintained moment-generating distance, if the second distance between the second wheel axle and the rotation point is shorter than the first distance between the first wheel axle and the rotation point.

Expediently, the first and the second wheel axles are arranged on the link element in such a way that the extents of the wheel axles are parallel with each other and the second wheel axle is arranged behind the first wheel axle viewed in the direction of travel.

Alternatively, the second wheel axle is also displaced in relation to the first wheel axle viewed in the direction of travel, so that wheels mounted on the axles end up on either side of the rotation point.

Expediently, the wheels are likewise arranged such that they are mutually overlapping. In this way, the pivotability is optimized.

Preferably, the surface of the respective wheel has a lateral peripheral surface for contact against the roadway, the wheels are mounted on the wheel axles in such a way that the peripheral surfaces are mutually facing.

The tendency of the wheel set to twist upon contact against an obstacle is thereby reduced.

Expediently, the frame is furnished with a stop member arranged for engagement with the link element to prevent the link element from turning over, so that the first wheel axle does not assume the position for the second wheel axle.

A user can thereby lift the frame of the vehicle without needing to rotate the link element into its original position prior to lowering.

Alternatively, the vehicle is a walking frame.
Preferably, two wheels are arranged on the respective first and second wheel axle.

Expediently, the wheel suspension is arranged non-pivotably on the vehicle, yet such as to allow the link element to rotate about the rotation point.

BRIEF DESCRIPTION OF DRAWINGS

The present invention will be explained in greater detail below with reference to the appended drawings, in which, in schematic representation:

FIG. 8a-8d show a sixth embodiment;

FIG. 9a-9b show a further embodiment; and

FIG. 10a-10b show a further embodiment.

DETAILED DESCRIPTION

Figure 1:
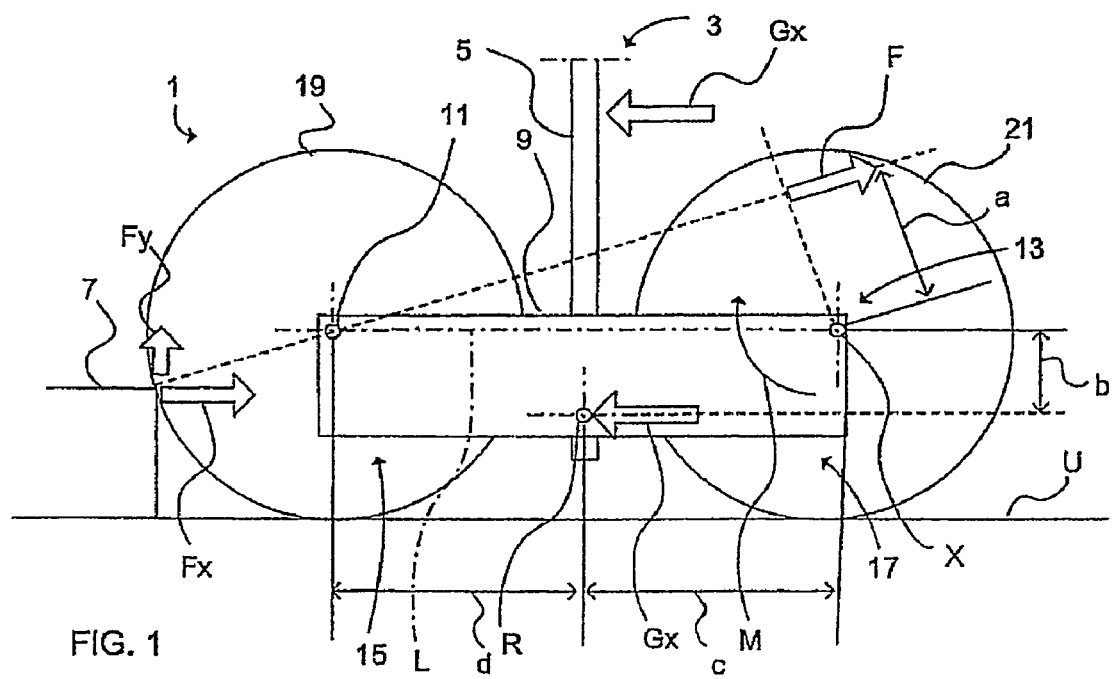
FIG. 1 shows a wheel suspension according to a first embodiment.

The present invention will now be described as illustrative embodiments. For the sake of clarity, components without importance to the invention have been omitted from the drawing. Same parts which are shown in a number of figures can in certain cases have no reference symbol, but can correspond to those which do have a reference symbol.

FIG. 1 shows a wheel suspension 1 according to a first embodiment. The wheel suspension 1 is mounted on a frame 3 comprising a fork 5 of a vehicle (not shown). In its direction of propulsion, the vehicle is arranged to be able to scale obstacles 7, such as a curb. The wheel suspension 1 comprises a link element 9, which is arranged rotatably on the fork 5 about a rotation point R. For propulsion of the vehicle, a force Gx is applied to the frame 3 and hence, via the fork 5, also to the rotation point R. The link element 9 in the form of a rectangular plate comprises a first (front) and a second (rear) wheel axle 11, 13 mounted on the front and rear portion 15, 17 respectively of the link element 9.

A front and a rear wheel 19, 21 are disposed in line one behind the other and are rotatably disposed on the respective wheel axle 11, 13. The rear wheel axle 13 serves as a moment axis X about which the link element 9 tends to rotate when a force Fx is applied, via the front wheel 19, to the front wheel axle 11 in a direction substantially opposite to the direction of travel. This force Fx and the force Fy are components forming the force F. The force F which is generated when a curb is mounted contributes to a rotary moment M about the rear wheel axle 13 lifting the front wheel 19.

The link element 9 is arranged to act as a lever arm by virtue of the rotation point R being situated at a distance b from an imaginary straight line L intersecting the first and the second wheel axle 11, 13 and in a plane transversely to the extent of the moment axis X. In order to create the lever arm b, the rotation point R has therefore been placed below the imaginary straight line L. The propulsive force Gx and the lever arm b creates a moment about the rear wheel axle 13, which moment lifts the link element 9. This moment is supplemented by a further moment created by the force F which acts upon the front wheel 19 and by the distance a. In the theoretical case in which the front wheel 19 of the wheel suspension 1 hits an obstacle 7 at least equal in height to the height of the wheel axles 11, 13 (or the radius of the wheel 19) above the ground surface U, the distance a would be equal to zero. Merely the lifting moment (the torque M) created by the force Gx and the distance b would thus cause the wheel suspension 1 to rotate about the second wheel axle 13.

In FIG. 1, the two wheel axles 11, 13 are placed symmetrically about the rotation point R and, since the wheels 19, 21 are disposed in line one behind the other, the pivotability of the vehicle is not affected when an obstacle is negotiated. According to this embodiment, a first distance d between the first wheel axle 11 and the rotation point R tallies with a second distance c between the second wheel axle 13 and the rotation point R.

Figure 2A:
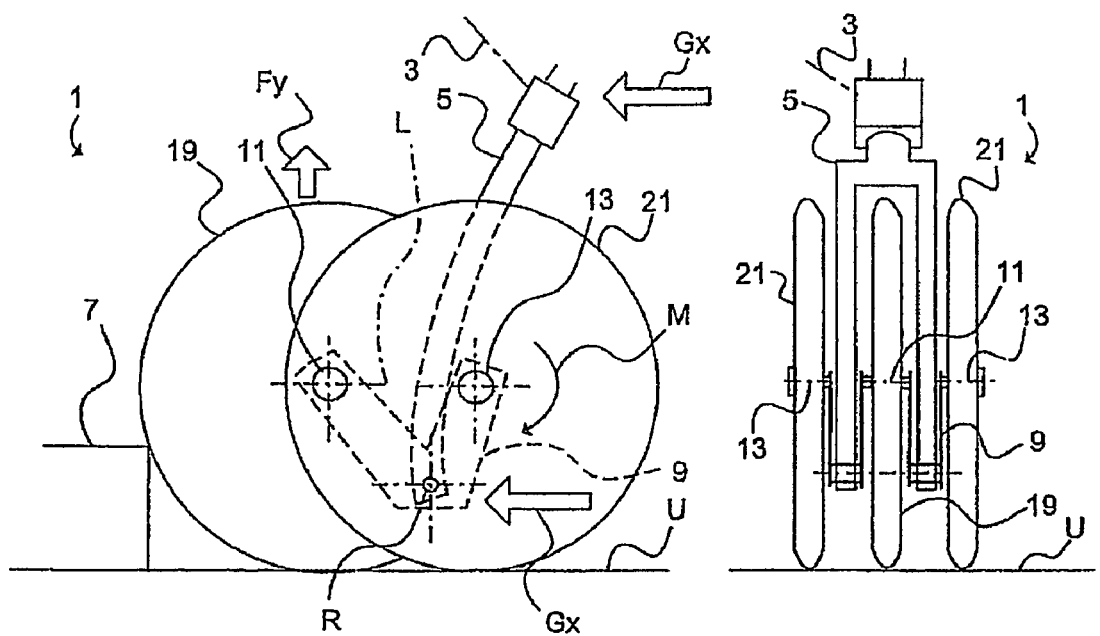
FIG. 2a-2b show a wheel suspension according to a second embodiment.
Figure 2B:
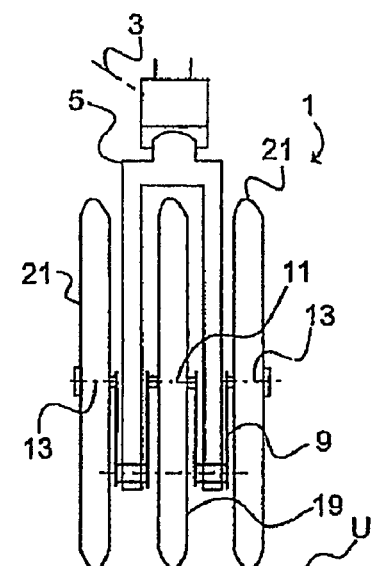

FIG. 2a-2b show in a side view and in a front view a wheel suspension 1 according to a second embodiment. The first and the second wheel axles 11, 13 are arranged parallel with each other on the link element 9. The first wheel axle 11 comprises a front wheel 19. The second wheel axle 13 is divided into two sub-axles, each supporting a rear wheel 21. The rear wheels 21 are arranged behind the front wheel 19 viewed in the direction of travel. The second wheel axle 13 (the two sub-axles) is/are displaced in relation to the first wheel axle 11 viewed in the direction of travel, so that the wheels 19, 21 mounted on the axles 11, 13 end up partially side by side and on either side of an imaginary line intersecting the rotation point R and running longitudinally parallel with the direction of travel. Alternatively, two front wheels can be mounted on the first wheel axle 11.

Figure 3A:
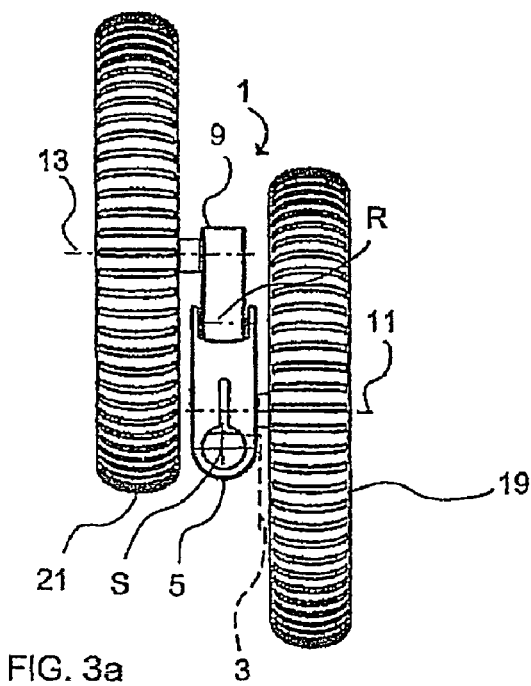
FIG. 3a-3b show a wheel suspension according to a third embodiment.
Figure 3C:
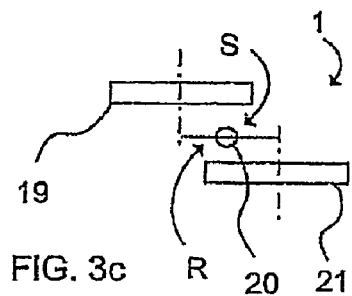
FIG. 3c shows a wheel suspension from above.
Figure 3B:
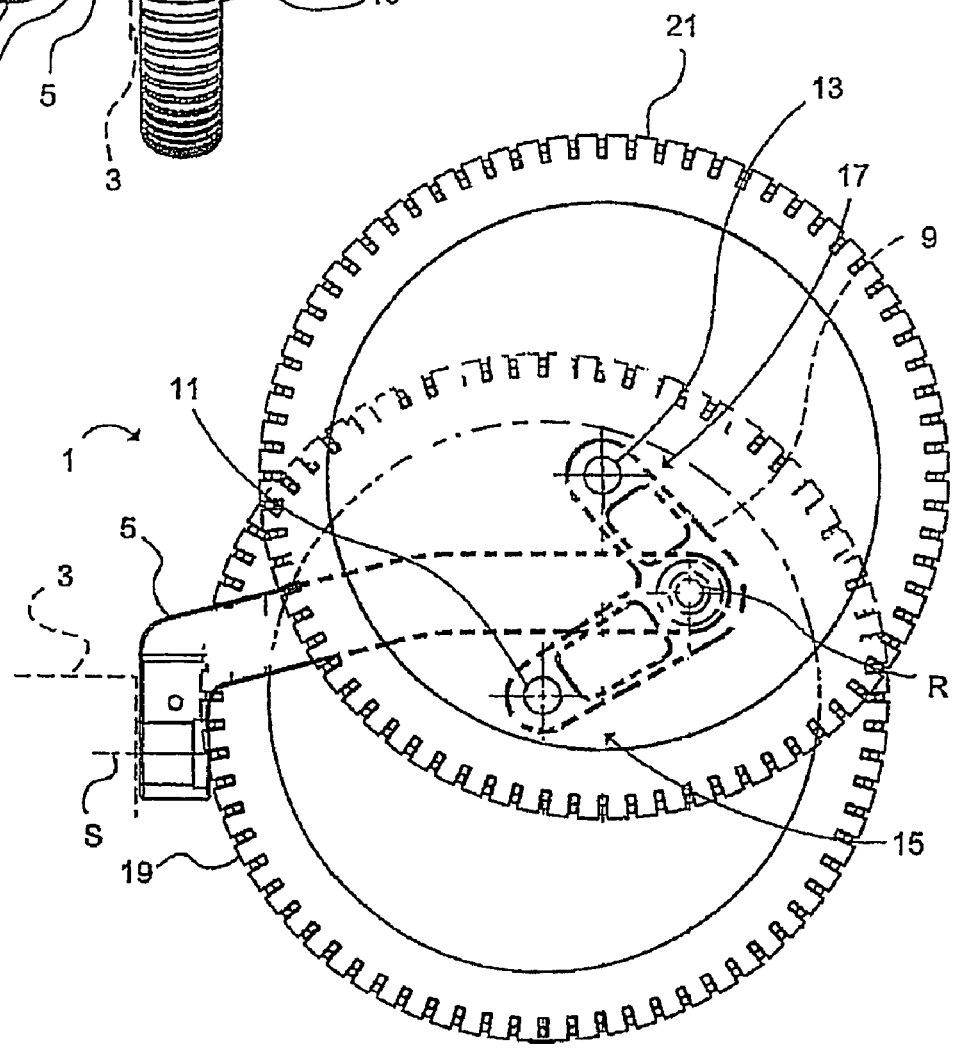

FIG. 3a-3b show a wheel suspension 1 according to a third embodiment. A front and a rear wheel 19, 21 are arranged on a link element 9. The wheels 19, 21 are situated partially side by side and are mutually displaced viewed in the direction of travel. FIG. 3a shows the wheel suspension 1 from above. The rotation point R of the wheel suspension 1 is constituted by a rotation axis disposed on a fork 5 (not shown) of a hand-operated vehicle (for example a walking frame, baby carriage). The fork 5 is arranged pivotably on the frame 3 of the walking frame on a pivot axis S. The link element 9 has a V-shape and supports the front and rear wheels 19, 21 on the respective link end, as is illustrated in FIG. 3b.

FIG. 3c shows a wheel suspension from above. The pivot axis is here a ball joint 20, simultaneously constituting a rotation point R and pivot axis S (instead of making the rotation point a horizontal axis in the direction transversely to the direction of travel separated from the pivot axis) and the two wheel axles are symmetrically placed on either side of the rotation point R. The symmetrical placement of the wheels 19, 21 allows an optimal pivotability of the vehicle. At the same time, the wheels are placed such that they are mutually overlapping and sufficiently wide apart that the pivotability is allowed to be optimized without affecting the structure of the wheel suspension 1.

Figure 4:
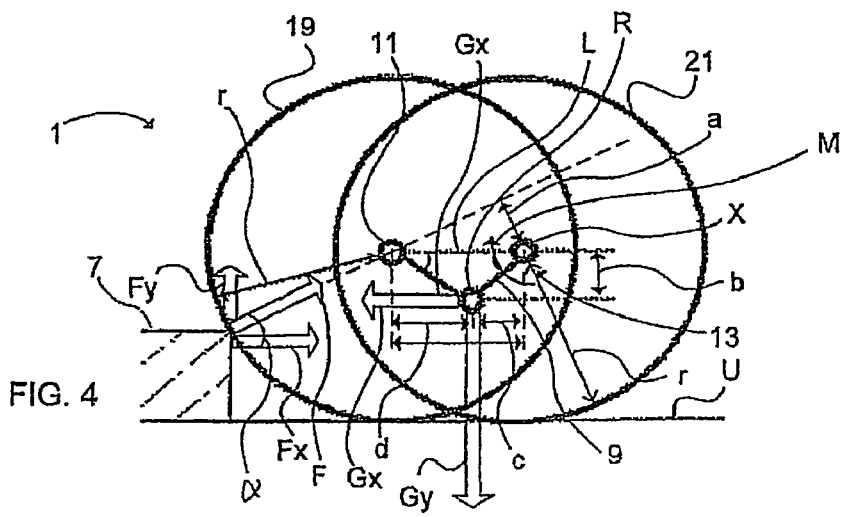
FIG. 4 shows the wheel suspension in FIG. 3a-3b with preferred dimensional relationships.

FIG. 4 shows schematically the wheel suspension 1 in FIG. 3a-3b according to one embodiment. In order to create lifting leverage to improve the climbing characteristics, the rotation point R of the link element 9 (the link arm) is placed a distance b below the imaginary straight line L intersecting the first and the second wheel axle 11, 13 and in a plane transversely to the extent of the moment axis X.

The ratio between the front distance d between the front wheel axle 11 and the rotation point R and the rear distance c between the rotation point R and the rear wheel axle 13 is such that the front distance d is greater than the rear distance c.

A simplified equation for calculating the rotation about X can be defined as:

$$F*a + Gx*b - Gy*c = 0;$$

in which F is the force absorbed by the wheel suspension 1 when an obstacle 7 is driven against. F is divided into the components Fy (lifting force) and Fx (a force acting against the vehicle in the direction of travel).

Gx is the force which acts upon the vehicle in the direction of travel. Gy is the force which is applied to the vehicle in direction of the ground surface U. In the case of a walking frame, the body weight of a user (not shown) will act upon the rotation point R with a force G (not shown) for propulsion of the walking frame. This force G is divided into the components Gy and Gx, where Gx is defined as the propulsive force.

The distance b is the created lever arm for improving the climbing characteristics of the walking frame. The distance b is greater than 0 and less than the radius r of the rear wheel 21. The distance b is between 2-90%, preferably 25-70%, of the radius r.

$$F*a + F*\cos \alpha *b - Gy*c = 0;$$

The angle $\alpha$ is determined by the relationship between the obstacle height and the radius r of the wheel, i.e. if the radius of the wheel is equal to the obstacle height, the angle $\alpha$ equals 0.

$$Fy = F*\sin \alpha;$$

in which Fy constitutes a lifting force for the wheel suspension 1.

Since the distance c is less than the distance d, the weight of the user will for the most part be distributed to the rear wheel 21, which further improves the climbing characteristics of the wheel suspension 1, as the front wheel, owing to the lesser load, tends to lift more easily from the ground surface.

Since the rotation point is depressed below the line L, the wheel suspension 1, when climbing in a rising manner over an obstacle when the link element ends up almost vertical or ends up so long that the rotation point R ends up in front of the first wheel axle 11 and the second wheel axle 13 viewed in the direction of travel, will operate with a lagging position in relation to the wheels 19, 21. This likewise helps the pivotability of the wheel suspension 1 to be optimized, that is to say when the two wheels 19, 21 end up behind the rotation point R.

Figure 5A:
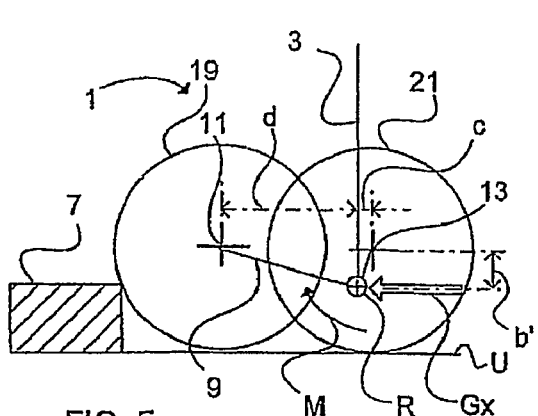
FIG. 5a-5b show a basic diagram for climbing.
Figure 5B:
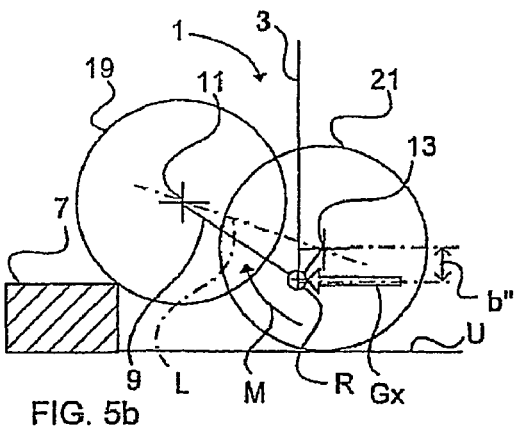

FIG. 5a-5b show a basic diagram for climbing over an obstacle 7. The front distance d between the first wheel axle 11 and the rotation axis R is substantially greater than the rear distance c. This in order to maintain the lever arm effect even when the wheel suspension 1 is climbing (see FIG. 5b). By making the rear distance c less than the front distance d and making the distance between the wheel axles 11, 13 as small as possible, a good pivot function of the wheel suspension is acquired. The fact that the distance c is small enables the rotation point R, in the course of the climbing, to be held in position below the rear wheel axle 13, the lever arm b" being maintained, yet slightly shorter than the lever arm b' in the non-climbing position of the wheel suspension 1 (see reference symbols b' and b" shown in FIGS. 5a and 5b).

The lever arm effect can thereby be acquired even in steep climbing, with a substantially maintained distance b, since the rear distance c between the second wheel axle 13 and the rotation point R is shorter than the front distance d between the first wheel axle 11 and the rotation point R.

Figure 6:
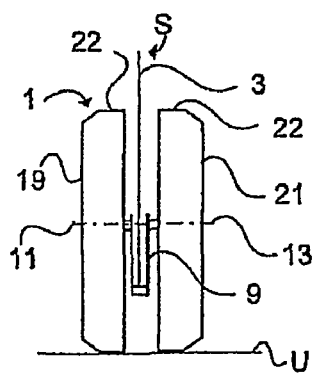
FIG. 6 shows a fourth embodiment.

FIG. 6 shows a fourth embodiment of the wheel suspension 1. The surface of the respective wheel 19, 21 has a juxtaposed peripheral surface 22 for contact against the ground surface U (the roadway). The wheels 19, 21 are mounted on the wheel axles 11, 13 in such a way that the peripheral surfaces 22 are mutually facing. The tendency of the wheel set 1 to twist upon contact with an obstacle 7 is thereby reduced, since the contact point of the front wheel 19 with the ground surface U and the pivot axis S have a minimum possible distance between them.

Figure 7:
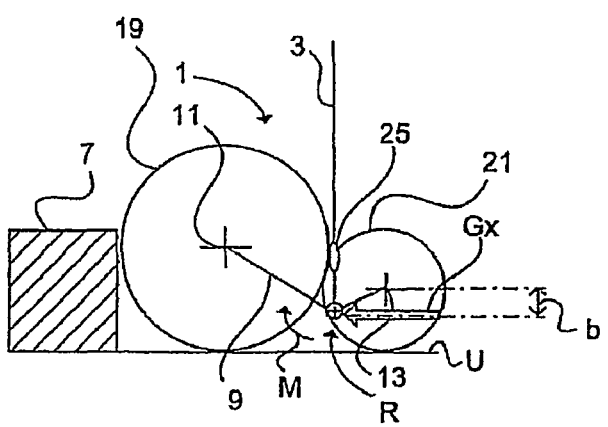
FIG. 7 shows a fifth embodiment.

FIG. 7 shows a fifth embodiment of the wheel suspension 1. According to this embodiment, the front wheel 19 which absorbs this first contact with the obstacle 7 has a larger diameter than the rear wheel 21. In the event, too, of the obstacle 7 being higher (see FIG. 7) than the radius of the front wheel 19, the propulsive force Gx generates on the rotation point R and the lever arm b acquired for the wheel suspension 1 a rotary moment M, so that the front wheel 19 tends to scale the obstacle 7. The frame 3 is furnished with a stop member 25 (rubber pad), which is arranged for engagement with the link element 9 to prevent the link element 9 from turning over, i.e. such that the first wheel axle 11 does not assume the position for the second wheel axle 13 when a user lifts the vehicle. The wheel suspension is mounted on a cross-country hand-operated vehicle, such as a baby carriage or a jogging cart (not shown).

A further preferred embodiment is shown schematically in FIG. 8a-8c. By virtue of this embodiment, a tendency of the wheel set to twist (viewed in the direction of travel) about the rotation point, upon contact with an obstacle causing the force F, is reduced. This is achieved by the second distance c between the second wheel axle 13 and the rotation point R being greater than the first distance d between the first wheel axle 11 and the rotation point R. By virtue of this embodiment, a greater part of the weight of the user is distributed to the front wheel 19, with the result that greater frictional force Ff (see FIG. 8c) (in the direction substantially transversely to the direction of travel) is generated between the front wheel 19 and the ground surface 7. The tendency of the wheel suspension to twist about the pivot axis S at the instant when the rear wheel 21 (FIG. 8c shows when the rear wheel 21 hits the obstacle with a force Fb) is thereby reduced. FIG. 8d shows schematically in perspective representation the wheel suspension in FIG. 8a.

A further embodiment is shown schematically in FIGS. 9a and 9b. An adjustable stop element 100 is attached to the pivot fork of the wheel suspension. FIG. 9a shows the stop element 100 in its activated position, preventing rotation of the link arm counterclockwise when it locks the axle 13 of the rear wheel. The stop element 100 limits the freedom of motion of the link arm 9, whereby the front wheel 19 is prevented from touching the ground surface with the result that the frictional resistance against the ground surface, when steering about the pivot axis S, is reduced, yet the obstacle-negotiating capability of the wheel suspension is maintained. A resistor 101 is arranged on the axle 13 of the rear wheel 21. FIG. 9b shows the stop element 100 in its neutral position, allowing rotation (shown with reference RM) of the link arm 9 both counterclockwise and clockwise, which gives the wheel suspension a both obstacle-negotiating and springing function (according to the above earlier description). The frictional resistance increases against the ground surface since both wheels are now in contact with the ground, also implying inertia in the steering, which may be preferred when the ground surface is uneven, and the vehicle becomes more directionally stable and the wheel does not "flutter" to and fro in the lateral direction. As a result of the stop element 100 being pushed downward (as is shown in FIG. 9a), the link arm 9 is prevented from rotating forward (the same rotation as the wheel during running in the direction of travel) and the front wheel is thus lifted from the ground surface, which gives optimal pivotability as only the rear wheel bears against the ground surface (less friction with one wheel against the ground surface than with two wheels against the ground surface). The wheel suspension has maintained its climbing function, since the front wheel 19 (in raised position) is arranged to be elevated such a distance from the ground surface that it can continue to come into contact with a possible obstacle.

A further embodiment is shown in FIGS. 10a and 10b schematically representing the wheel suspension arranged non-pivotably in the horizontal plane. The first distance d between the first wheel axle 11 and the rotation point R is equal in size to the second distance c between the rotation point R and the second wheel axle 13. The obstacle-clearing characteristics are the same regardless of the direction of travel. The link element 9, which is rotatably arranged about the rotation point R via two axles 110 on a base plate 115, comprises three flanges 111', 111", 111'". The flanges are rotatably arranged on the two ends of the axles 110, with which the front wheel 19 and the rear wheel 21 are rotatable about the rotation point R. The more powerfully configured link element with double fork fastening and its configuration with three flanges (with the shape of an M) and short axles 110 gives high strength allowing a high load-bearing capacity. This embodiment is suitable for transport wheels or furniture wheels (transport cages, carts, office and hospital furniture, etc.). This embodiment of the wheel suspension can also be configured pivotably in the lateral direction by being mounted on the top side of the base plate 115.

The present invention should not be deemed to be limited to above-described illustrative embodiments, but rather modifications and combinations thereof can appear within the scope of the present invention. The wheel suspension can be used on a walking frame, golf cart, baby carriage, shopping trolley, transport cars of various kinds, or other vehicles such as rail vehicles, cableways, etc. The wheel suspension is not limited to being pivotably arranged on the vehicle, for pivoting in the lateral direction. The wheel suspension comprising the rotation point can also be mounted fixedly on the vehicle, i.e. non-pivotably arranged, for example on the vehicle at a suitable location in which a second steerable wheel of the vehicle provides for the steering of the vehicle in the lateral direction. The wheel suspension can also be provided with runners, skis, etc. instead of wheels, in, for example, a snow scooter or the like, in which the term wheel axle is replaced with the term axle.

The invention claimed is:

1. A wheel suspension for mounting on a frame of a vehicle, which, in its direction of travel, is arranged to be able to scale an obstacle;
    the wheel suspension comprises a link element arranged rotatably about a rotation point, to which rotation point a force (Gx) can be applied, via the frame, for propulsion purposes;
    the link element comprises a first wheel axle and a second wheel axle, wherein a first wheel is mounted on the first wheel axle and a second wheel is mounted on the second wheel axle, the second wheel axle being arranged behind the first wheel axle, the first and second wheels mounted on the first and second wheel axles, respectively, being disposed on either side of the rotation point;
    the second wheel axle serves as a moment axis about which the link element tends to rotate when a force is applied to the first wheel axle in a direction opposite to the direction of travel, wherein the link element acts as a lever arm by virtue of the rotation point being situated at a distance from an imaginary straight line intersecting the first wheel axle and the second wheel axle, the imaginary straight line being in a plane oriented transversely to the extent of the moment axis, and wherein the first and second wheels are mutually overlapping.

2. The wheel suspension as claimed in claim 1, wherein the first and the second wheel axles are arranged on the link element in such a way that the first and second wheel axles are parallel with each other.

3. The wheel suspension as claimed in claim 2, wherein the second wheel axle is spaced in relation to the first wheel axle along the direction of travel.

4. The wheel suspension as claimed in claim 3, wherein a surface of each of the first and second wheels includes a juxtaposed peripheral surface for contact against a ground surface, the wheels are mounted on the first and second wheel axles in such a way that the peripheral surfaces are mutually facing.

5. The wheel suspension as claimed in claim 4, wherein the frame includes a stop member to engage with the link element to prevent the link element from turning over.

6. The wheel suspension as claimed in claim 5, wherein the vehicle is a walking frame.

7. The wheel suspension as claimed in claim 6, wherein the wheel suspension is arranged non-pivotably on the vehicle and to allow the link element to rotate about the rotation point.

8. The wheel suspension as claimed in claim 1, wherein a first distance between the first wheel axle and the rotation point differs from a second distance between the second wheel axle and the rotation point.

9. The wheel suspension as claimed in claim 8, wherein the first and the second wheel axles are arranged on the link element in such a way that the extents of the wheel axles are parallel with each other.

10. The wheel suspension as claimed in claim 9, wherein the second wheel axle is spaced in relation to the first wheel axle along the direction of travel.

11. The wheel suspension as claimed in claim 9, wherein a surface of each of the first and second wheels has a juxtaposed peripheral surface for contact against a ground surface, the wheels are mounted on the wheel axles in such a way that the peripheral surfaces are mutually facing.

12. The wheel suspension as claimed in claim 1, further including:
    an adjustable stop element attached to the wheel suspension, the adjustable stop element operable to be adjusted to an activated position, wherein when in the activated position the adjustable stop element is operable to lock the second wheel axle and prevent a counterclockwise rotation of the link element.

13. The wheel suspension as claimed in claim 12, wherein when the adjustable stop element is in the activated position, the first wheel is prevented from touching a ground surface, the ground surface in contact with the second wheel.

14. The wheel suspension as claimed in claim 12, wherein the adjustable stop element is further operable to be adjusted to a neutral position, wherein when in the neutral position the adjustable stop element is operable to allow rotation of the link element in both a clockwise direction and a counterclockwise direction.

15. The wheel suspension as claimed in claim 1, wherein a first distance between the first wheel axle and the rotation point tallies with a second distance between the second wheel axle and the rotation point.

16. The wheel suspension as claimed in claim 1, wherein the frame is furnished with a stop member arranged for engagement with the link element to prevent the link element from turning over.

17. The wheel suspension as claimed in claim 1, wherein the vehicle is a walking frame.

18. The wheel suspension as claimed in claim 1, wherein the wheel suspension is arranged non-pivotably on the vehicle, yet such as to allow the link element to rotate about the rotation point.

19. A wheel suspension for mounting on a frame of a vehicle, which, in its direction of travel, is arranged to be able to scale an obstacle;
    the wheel suspension comprises a link element arranged rotatably about a rotation point, to which rotation point a force (Gx) can be applied, via the frame, for propulsion purposes;
    the link element comprises a first wheel axle and a second wheel axle;
    the second wheel axle serves as a moment axis about which the link element tends to rotate when a force is applied to the first wheel axle in a direction opposite to the direction of travel, wherein the link element acts as a lever arm by virtue of the rotation point being situated at a distance from an imaginary straight line intersecting the first wheel axle and the second wheel axle, the imaginary straight line being in a plane oriented transversely to the extent of the moment axis; and
    an adjustable stop element attached to the wheel suspension, the adjustable stop element operable to be adjusted to an activated position, wherein when in the activated position the adjustable stop element is operable to lock the second wheel axle and prevent a counterclockwise rotation of the link element.

20. The wheel suspension as claimed in claim 19, wherein when the adjustable stop element is in the activated position, a front wheel coupled to the link element is prevented from touching a ground surface, the ground surface in contact with a second wheel coupled to the link element.

21. The wheel suspension as claimed in claim 19, wherein the adjustable stop element is further operable to be adjusted to a neutral position, wherein when in the neutral position the adjustable stop element is operable to allow rotation of the link element in both a clockwise direction and a counterclockwise direction.

* * * * *